United States Patent
Marks

[15] 3,648,806
[45] Mar. 14, 1972

[54] VEHICLE EMERGENCY STOP SYSTEM

[72] Inventor: Charles Bryan Marks, 2011 Mills Cir., Las Vegas, Nev. 89016

[22] Filed: Sept. 15, 1970

[21] Appl. No.: 72,394

[52] U.S. Cl. ........................... 188/2 R, 180/82, 244/110 B
[51] Int. Cl. ........................................................ B60k 1/12
[58] Field of Search ............... 188/2 R, 270; 180/82, 105, 180/108, 109; 244/110 A, 110 B

[56] References Cited

UNITED STATES PATENTS

| | | | |
|---|---|---|---|
| 2,797,951 | 7/1957 | McClean et al. | 188/270 |
| 3,003,572 | 10/1961 | Sanger | 244/63 X |
| 3,013,751 | 12/1961 | Scott et al. | 244/110 B |
| 3,064,762 | 11/1962 | Zizzi | 188/2 R |
| 3,434,569 | 3/1969 | Peters et al. | 188/2 R |

*Primary Examiner*—Duane A. Reger
*Attorney*—Dugger, Peterson, Johnson & Westman

[57] ABSTRACT

Emergency stop apparatus for a land vehicle that includes a forwarding pointing jet nozzle, a tank connected to the nozzle for applying fluid under pressure to the nozzle, a subframe for mounting the nozzle on the vehicle frame, blocking mechanism at the forward end portion of the nozzle to selectively permit the escape of fluid from the nozzle and control mechanism for selectively operating the blocking mechanism to a fluid discharge condition. In one embodiment, the blocking mechanism includes a pivotally mounted apertured ball while in other embodiments the blocking mechanism includes a pair of jaws for releasably retaining a back up member and a resilient cup in the nozzle bore, and in a further embodiment, jaws support resilient member to prevent perforation thereof until the jaws move apart. In another embodiment a cap-cup combination is provided to control the discharge of fluid. The control mechanism of some of the embodiments includes a manually operated switch connected in series with the ignition switch and a brake operated switch for actuating an operator to move the jaws (or cap, or ball) to a nozzle member discharge condition. In some of the embodiments a governor is provided for operating a switch in the control circuit whereby the jaws or cap, or ball) are retained in a datum, non nozzle discharge condition until the vehicle has exceeded a preselected speed. Disclosed are both electrically and hydraulically actuated operators.

34 Claims, 23 Drawing Figures

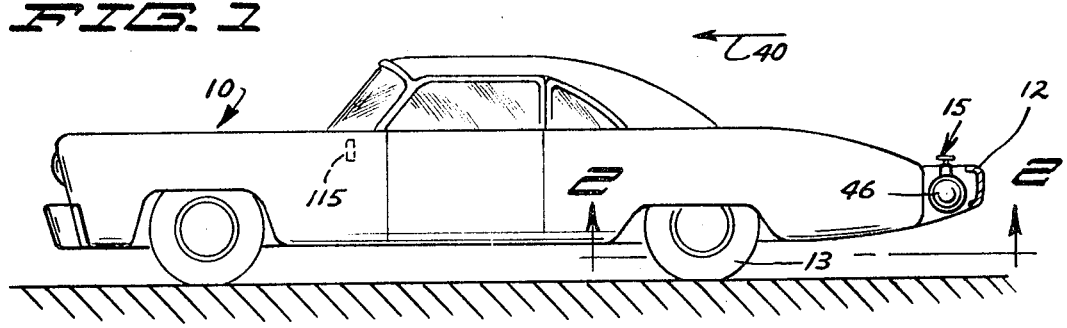
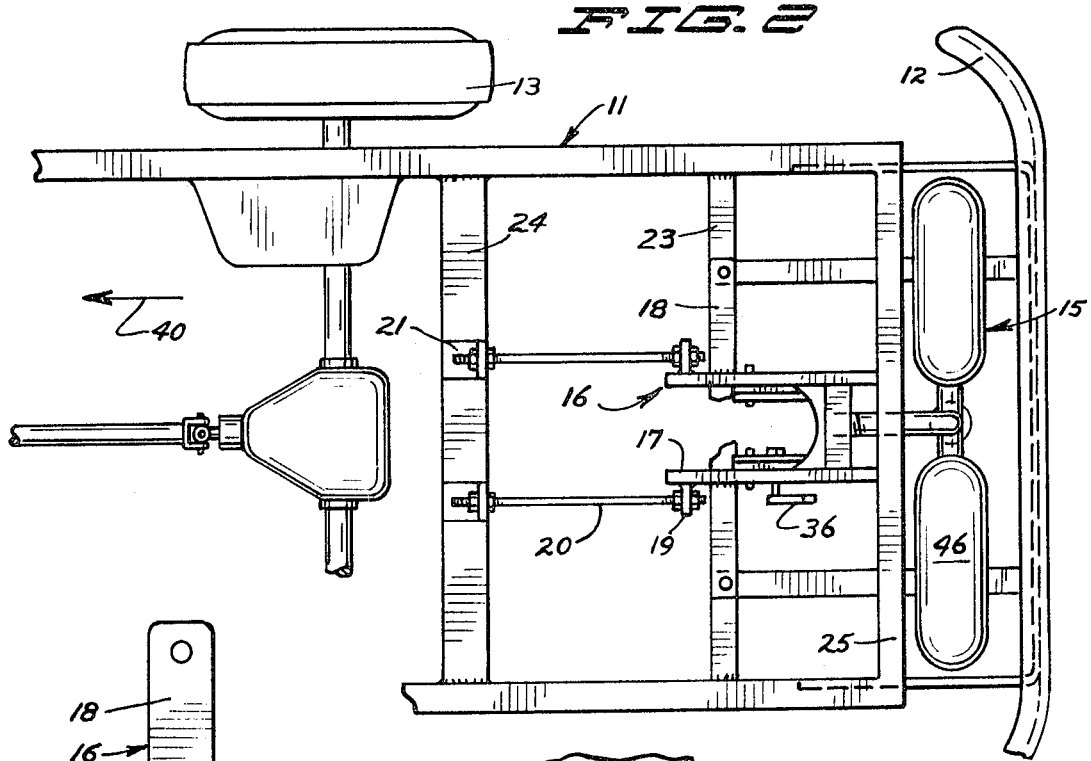
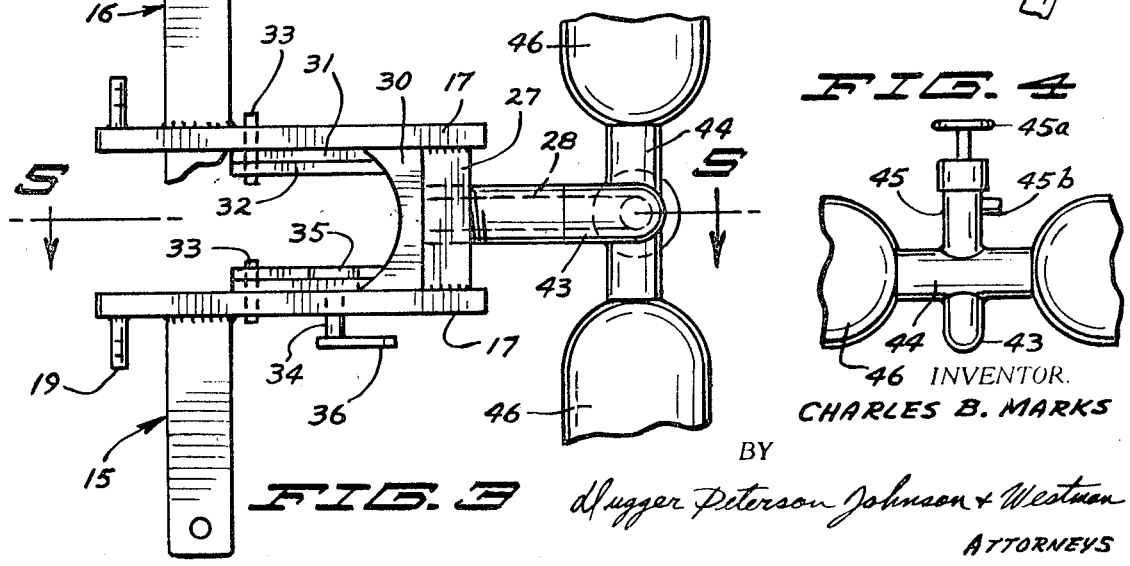

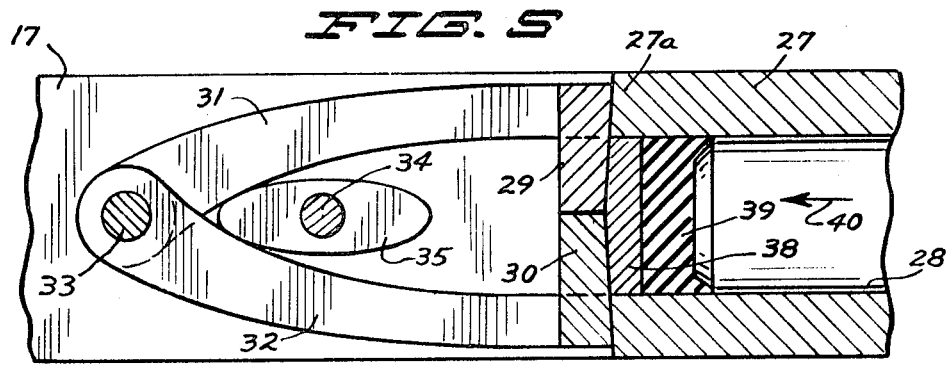
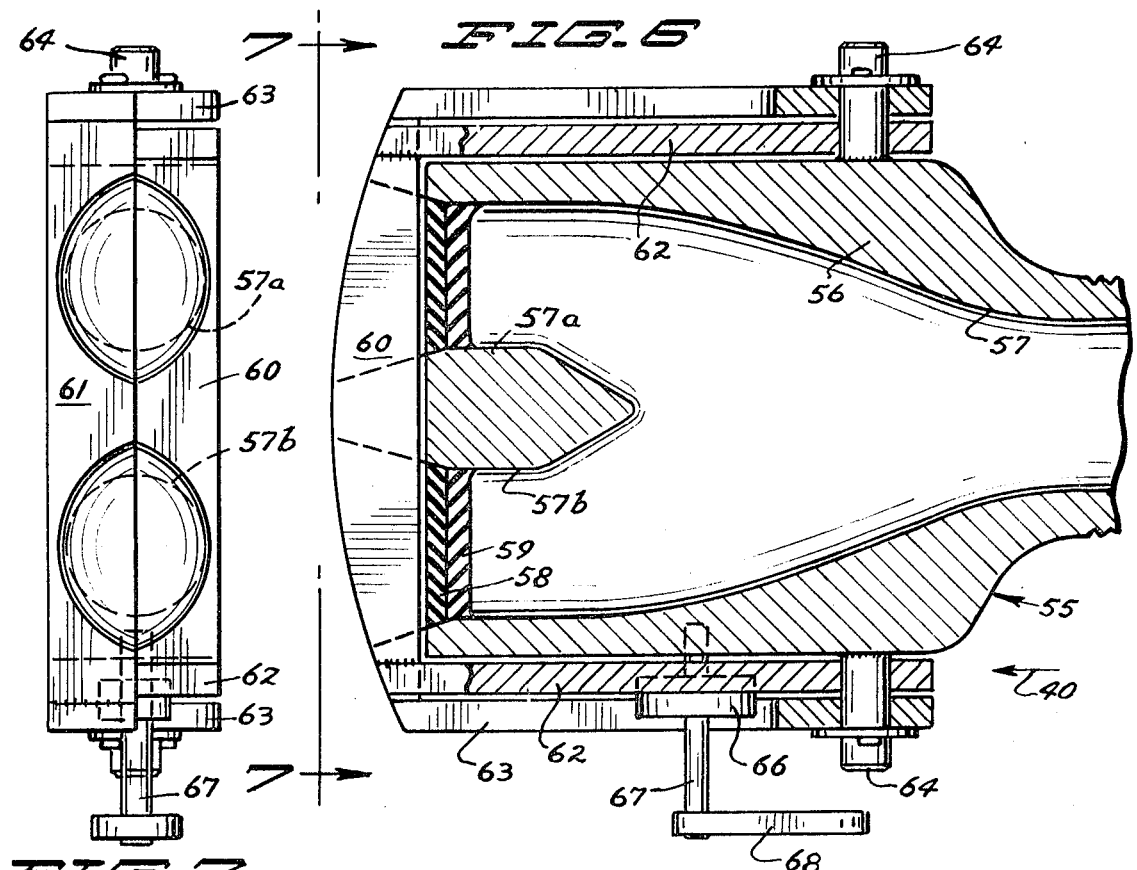
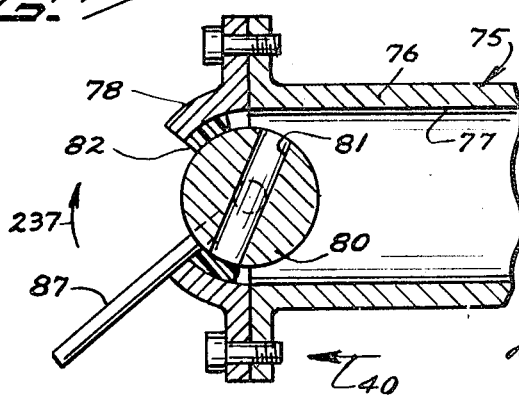
INVENTOR.
CHARLES B. MARKS

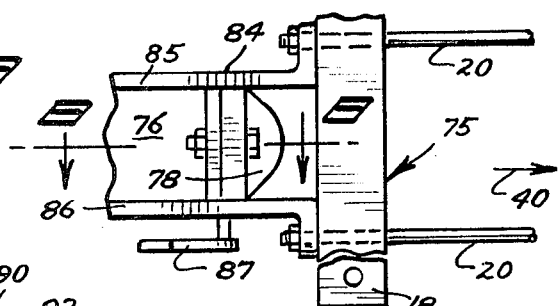
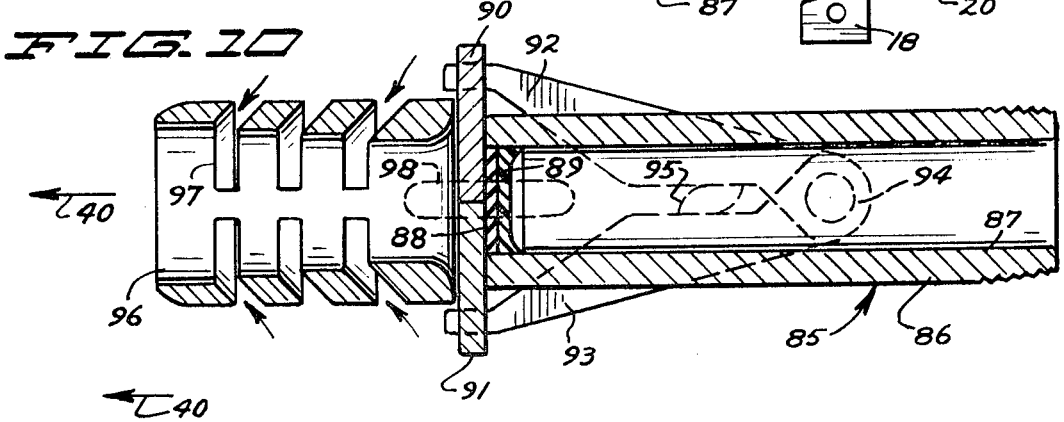
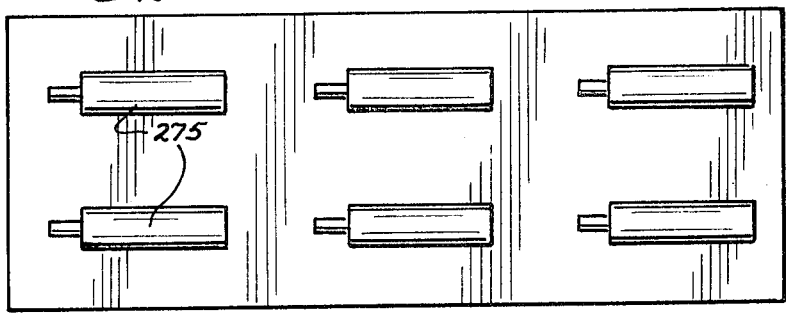
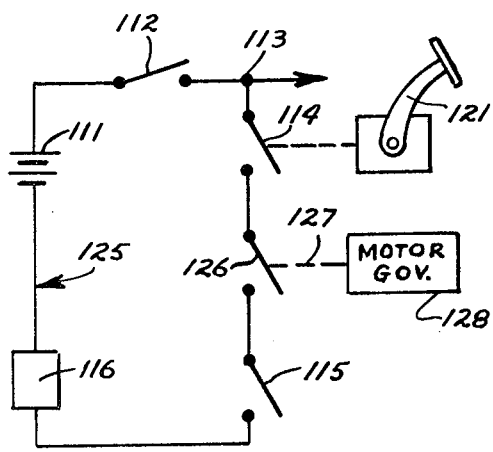
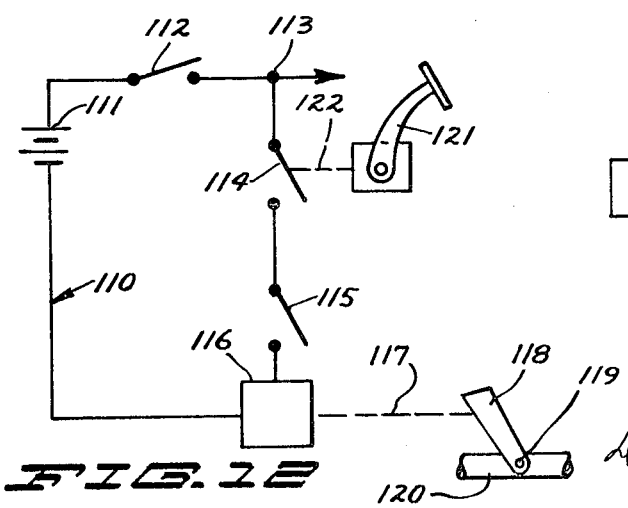
INVENTOR.
CHARLES B. MARKS

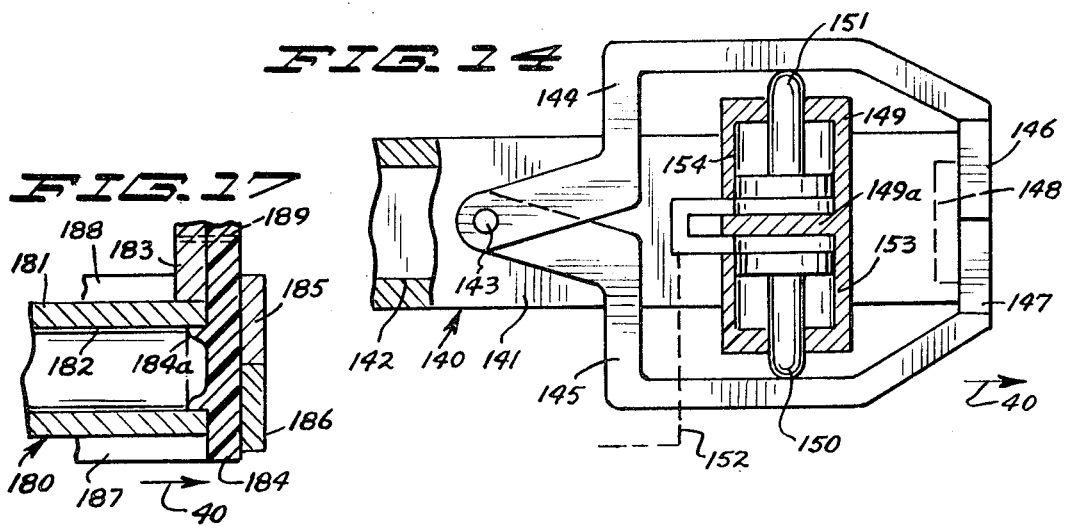
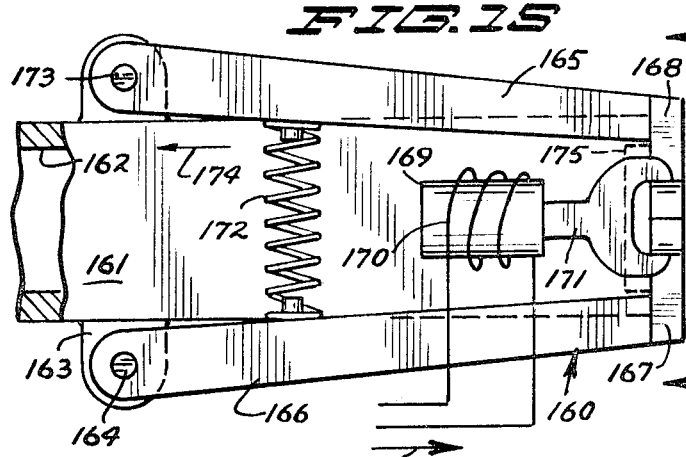
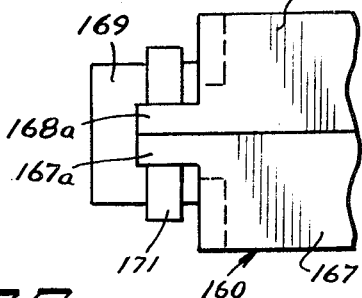
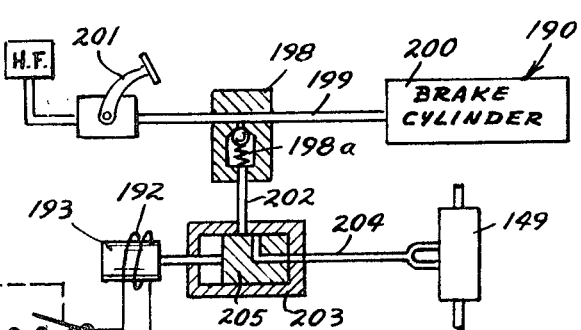
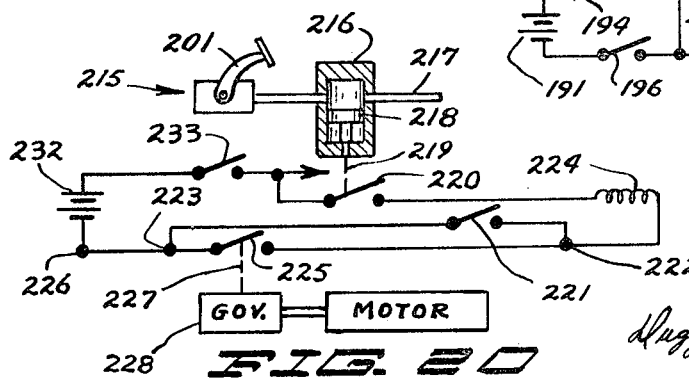
INVENTOR.
CHARLES B. MARKS

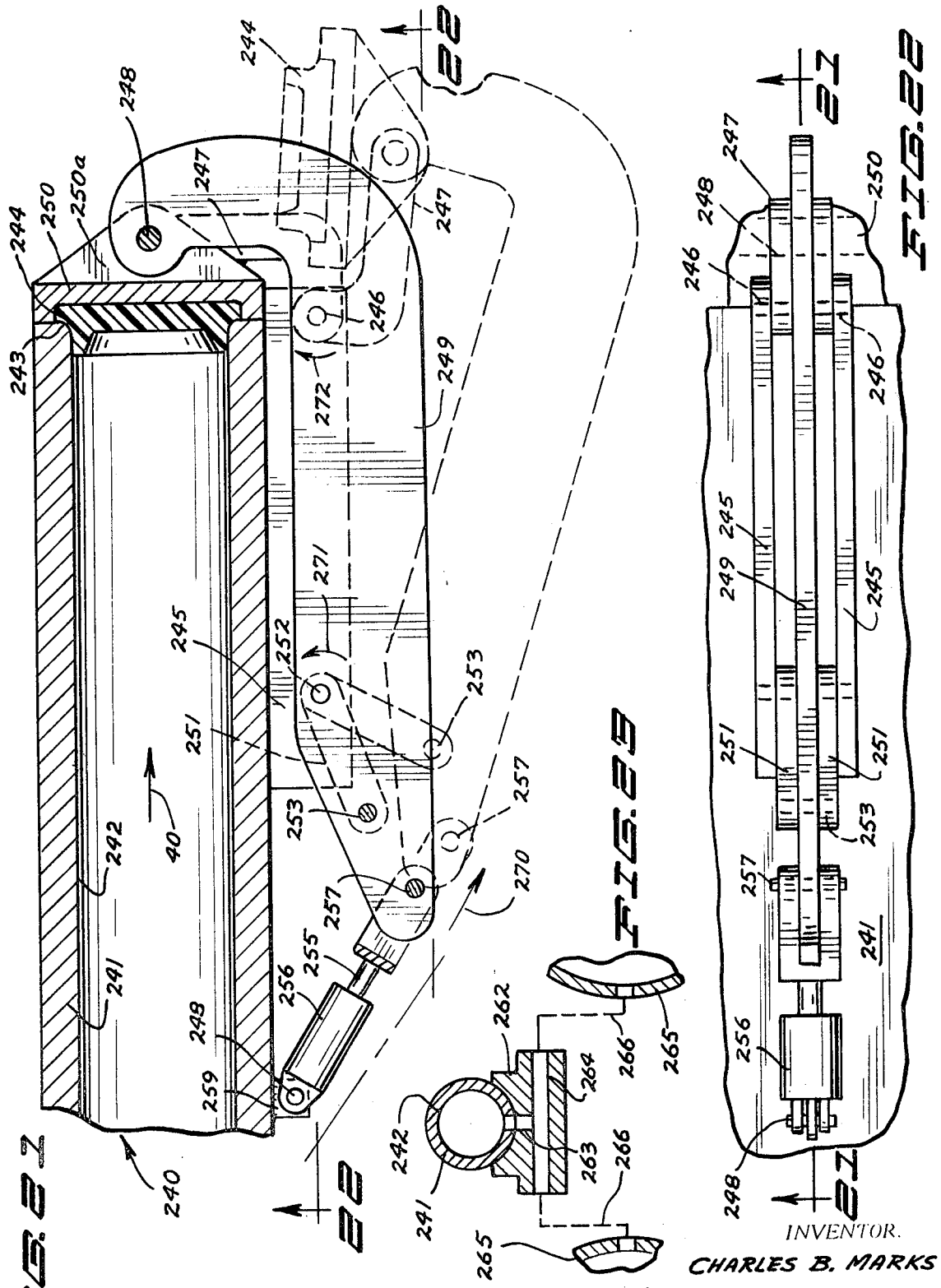

3,648,806

1
VEHICLE EMERGENCY STOP SYSTEM

BACKGROUND OF THE INVENTION

Land vehicle braking systems.

In the prior art, for example, U.S. Pat. No. 3,003,572, there is broadly disclosed a land vehicle for launching aircraft that has a steam rocket that can be selectively used for accelerating and decelerating the land vehicle. However such apparatus, as a practical matter, is not suitable for use on a vehicle such as automobiles and trucks that are used by the general public. Further there does exist the problem that in driving, an emergency stop situation arises wherein the conventional brakes on automobiles and trucks sold to the general public will not stop the vehicle quickly enough to avoid an accident. In order to overcome problems such as mentioned above as well as others, this invention has been made.

SUMMARY OF THE INVENTION

To assist in stopping a vehicle, a brake system, a nozzle member having a discharge outlet, a device to releasably block the discharge outlet, a movable mounting member to move said device between a blocking position and a fluid discharge position, and control mechanism for operating the mounting member between its position including a switch operated by the brake of said brake system.

One of the objects of this invention is to provide new and novel apparatus to aid a braking system in stopping a powered, land vehicle. Another object of this invention is to provide new and novel jet assist apparatus to aid in stopping a land vehicle. In furtherance of the above objects, it is a further object to provide new and novel control mechanism that is in part actuated to a stop condition by depressing the brake pedal of the vehicle. In furtherance of the last mentioned object, it is another object of this invention to provide a governor operated and/or a manually operated switch to act in conjunction with the depression of the brake pedal to initiate the stopping action of jet stop apparatus.

FIG. 1 is a side view of a land vehicle having the emergency stop system of this invention;

FIG. 2 is a fragmentary bottom view of the vehicle of FIG. 1 to illustrate the mounting of the first embodiment of jet stop apparatus of this invention on the vehicle frame, said view being generally taken along the line and in the direction of the arrows 2—2 of FIG. 1;

FIG. 3 is an enlarged fragmentary bottom view of a portion of the apparatus of FIG. 2, portions of the tanks and mounting frame member being broken away;

FIG. 4 is a fragmentary rear view illustrating a valve to permit filling the tanks;

FIG. 5 is a fragmentary cross sectional view generally taken along the line and in the direction of the arrows 5—5 of FIG. 3 to more clearly illustrate the mounting of the jaws for movement between a position to retain the fluid seal member in the nozzle member, and a spread apart position permitting the fluid seal member moving out of the nozzle member;

FIG. 6 is a horizontal cross sectional view of a second embodiment of the jet stop apparatus of this invention;

FIG. 7 is an end view of the apparatus of FIG. 6, said view being generally taken along the line and in the direction of the arrow 7—7 of FIG. 6 and showing the jaws in a closed position;

FIG. 8 is a fragmentary vertical cross sectional view of a third embodiment of the jet stop apparatus of this invention, said view being generally taken along the lines in the direction of the arrows 8—8 of FIG. 9;

FIG. 9 is a fragmentary top view of the apparatus of FIG. 8;

FIG. 10 is a vertical cross sectional view of the fourth embodiment of the jet stop apparatus of this invention;

FIG. 11 is a schematic representation of a number of the jet stop members of one of the embodiments of the invention mounted on the frame of a land vehicle;

2

FIG. 12 is a schematic representation of a first embodiment of a control circuitry for actuating the jet stop apparatus to a discharge position;

FIG. 13 is a schematic representation of a second embodiment of control circuitry for actuating jet stop apparatus to a discharge position;

FIG. 14 is a fragmentary side view of a fifth embodiment of the jet stop apparatus of this invention with a portion of the nozzle member and piston cylinder combination being shown in cross section;

FIG. 15 is a fragmentary side view of a sixth embodiment of the jet stop apparatus of this invention;

FIG. 16 is a fragmentary end view generally taken along the line and in the direction of the arrows 16—16 of FIG. 15;

FIG. 17 is a fragmentary, longitudinal cross sectional view of the seventh embodiment of the jet stop apparatus of this invention;

FIG. 18 is a fragmentary end view of the resilient member of FIG. 17;

FIG. 19 is a schematic representation of a third embodiment of the control circuitry for actuating jet stop apparatus to a discharge position;

FIG. 20 is a schematic representation of a fourth embodiment of the control circuitry for actuating jet stop apparatus to a discharge position;

FIG. 21 is a fragmentary longitudinal cross sectional view of the eighth embodiment of the jet stop apparatus of this invention; said view being generally taken along the line and in the direction of the arrows 21—21 of FIG. 22;

FIG. 22 is a fragmentary view generally taken along the line and in the direction of the arrows 22—22 of FIG. 21; and FIG. 23 is a fragmentary transverse cross sectional view of the inlet end portion of the apparatus of FIG. 21 and a diagrammatic representation of the connection of the fluid supply tanks thereto.

Referring now in particular to FIGS. 1–5, there is illustrated a motorized land vehicle, generally designated 10, that has rear wheels 13 and a land vehicle frame, generally designed 11 on which there is mounted a bumper 12 and the first embodiment of jet stop apparatus generally designated 15. It is to be understood that the construction of the vehicle frame does not impose a limitation on this invention and that a particular type frame has been shown only for exemplary purposes to facilitate an understanding of the invention. The vehicle frame 11 has a plurality of longitudinally spaced, transverse frame members 23, 24 and 25, the bumper 12 being mounted a substantial distance rearwardly of the rear frame member 25.

The jet stop apparatus 15 includes a subframe, generally designated 16 that has a pair of elongated, transversely spaced, longitudinally extending frame members 17. The rearward ends of the frame members 17 are appropriately attached to the frame member 25, for example by being bolted or welded thereto. A transverse subframe member 18 is welded to forward intermediate portions of frame member 17 in overlying relationship thereto to extend transversely outwardly beyond each of the frame members 17; frame member 18 being bolted to frame member 23. Welded to the forward end portion of each of the frame members 17 to extend transversely outwardly therefrom is a tab 19, there being provided a rod 20 that has its rear end portion extended through an appropriate aperture in the respective tab and retained in a fixed position relative to the tab by nuts threaded on the rod to abut against opposite sides of the tab. The forward end of each of the rods 20 is extended through an appropriate aperture in a bracket 21 and retained in a fixed longitudinal position by appropriate nuts threaded on the rod; the brackets 21 being welded or bolted to the frame member 24.

A nozzle member 27 has a forward block portion that extends between and is welded to the adjacent rearward end portions of frame members 17. The nozzle member has a longitudinally elongated bore 28 that opens forwardly into the space between the frame members 17. Mounted in the forward discharge end portion 27a of the nozzle member is a metal back up member 38, while just rearwardly of the back up member is a resilient cup 39 that has an axially rearwardly extending peripheral flange; the cup forming a fluid seal with the wall defining the bore 28.

For releasably retaining the back up member and resilient cup in the discharge end portion of the nozzle member, there is provided a pair of transverse spaced arms 31 that have their forward ends connected to adjacent frame member 17 by a pivot member 33. The rearward ends of the arms 31 mount a transversely extending upper jaw 29; a corresponding pair of arms 32 likewise having their forward end portions pivotally mounted on the pivot members 32 and their rearward end portions mounting a lower jaw 30. In the datum position, the adjacent transverse edges of the jaws abut against one another at a location at approximately one-half the distance between the uppermost and lowermost portions of bore 28. The back surfaces of the jaws and the front surfaces of the back up member are tapered to retain the back up member in the nozzle while at the same time permitting the jaws 29,30 pivoting in opposite direction about the pivotal axis of pivots 33 to a spread apart position that the back up member and resilient cup may move longitudinally forwardly between the adjacent edges of the jaws. Further the surface members 29, 30 and 38 are tapered such that when pressure in the nozzle member is exerted in a forward direction (arrow 40) against cup 39, the jaws are retained in the datum closed position of FIG. 5. Advantageously springs (not shown) may be connected to the jaws are arms to resiliently retain the jaws in the datum position when no fluid under pressure is in bore 28.

In order to move the jaws to the spread apart discharge position, there is provided a cam member 35 that is mounted longitudinally intermediate one pivot member 33 and the jaws to upon pivoting about the transverse axis of the cam shaft 34 on which the cam is mounted to move therewith, spread the jaws to their open position. The cam shaft is rotatably mounted by one of the frame members 17 and has an elongated operating arm 36 mounted thereon. The structure for moving the operating arm to rotate the shaft 34 and thereby the cam about the transverse axis of the shaft will be set forth hereinafter.

A tube 43 connects the rear inlet end of the nozzle member 27 to an intermediate portion of a transverse connector 44. The opposite ends of the connector mount tanks 46 while a valve 45 is also mounted by the connector. The valve has an inlet nozzle portion 45b and a hand member 45a. The valve is operable between a first position that fluid communication from the connector to tube 43 is blocked, while an open fluid passageway is provided between nozzle 45b and tanks 46; a second position that fluid communication between the nozzle 45b and connector 44 is blocked and also fluid communication between the tube 43 and the connector is blocked; and a third position that fluid communication between the inlet nozzle 45b and connector 44 is blocked and the tube 43 is in fluid communication with the tanks 46. Accordingly, in the valve third position, the tanks 46 are in fluid communication with the bore 28 of the nozzle member. It is to be understood valve 45 may be a two position valve which permits fluid communication between inlet 45b and both tube 43 and connector 44, and alternately blocks fluid communication between said members.

Referring to FIGS. 6 and 7, the second embodiment of the jet stop apparatus, generally designated 55, includes a nozzle member 56 having a longitudinally elongated bore 57. The forward discharge end of the bore 57 is formed as two generally cylindrical, transversely spaced bore portions 57a and 57b respectively. In each of the discharge end portions there is provided a back up member 58 and a resilient cup 59.

For releasably retaining the back up member and cup in the respective bore portions, there are provided a pair of jaws 60,61; each jaw in the closed position blocking one-half of each of the discharge ends of bore portions 57a, 57b. Mounting the jaw 60 for pivotal movement between a datum closed and an open position are a pair of transversely spaced arms 62 while the other jaw is mounted for pivotal movement by a pair of arms 63. The rearward end portions of the arms 62,63 are pivotally mounted by the studs 64, there being one stud secured to the mounting nozzle member on each side of the bore 57.

A cam shaft 67 is pivotally mounted by the nozzle member, the cam shaft mounting a cam member 66 between one set of the arm 62,63 to upon turning the cam shaft move the arms and thereby the jaws from the closed position to the open position. The adjacent surfaces of the nozzle member, member 38 and jaws 60,61 are appropriately tapered to permit the jaws being moved between said positions, while springs (not shown) may be provided to retain the arms in a jaw closed position. An elongated arm 68 is keyed to the cam shaft for turning the cam shaft. A suitable subframe (not shown) is provided for mounting the nozzle member 57 in a position corresponding to that illustrated for the stop assembly in FIG. 2 wherein the discharge end portions of the bore 57a, 57b, point in a forward position relative the vehicle. Further the inlet end of bore 57 is in fluid communication with connector 43.

Referring now to FIGS. 8 and 9 there is shown a third embodiment of the jet stop apparatus, generally designated 75 that includes a nozzle member having a nozzle member main body 76 and a nozzle member cap 78 that is bolted to the nozzle body. The nozzle body has a longitudinally elongated nozzle bore 77 that opens to the interior of the cap 78 for discharging through the central aperture of the cap that is longitudinally aligning with the nozzle bore.

A valve ball 80 is mounted in the forward portion of the nozzle body and extends within the nozzle cap, there being provided annular seal member 82 to form a fluid seal between the ball and the interior wall of the cap 78. Mounted by the ball are diametrically opposed, transverse studs 84, the studs being pivotally extended through the forward end portion of the nozzle body and the adjacent longitudinally extending, transversely spaced subframe members 85,86. The forward end portions of the subframe members are connected by transverse frame member 18, which is bolted to the vehicle frame such as indicated in FIG. 2; and have tabs that mount the back end portions of the connecting rods 20.

The ball 80 has a central bore 81 extending thereto, a cam shaft arm 87 being keyed to one of the studs 84 for rotating the ball between a position that one end of the bore is closed by the fluid seal member 82 and a second position that the bore 81 is longitudinally aligned with the central axis of the nozzle body so that fluid under pressure flows through the bore 77 to be discharged generally horizontally forwardly through the bore 81. The inlet end (not shown) of bore 77 is fluidly connected to a source of fluid under pressure through, for example connector 43.

Referring now to FIG. 10, the fourth embodiment of the jet stop apparatus, generally designated 85, includes a longitudinally elongated nozzle member 86 having a central elongated nozzle bore 87 extended therethrough. Mounted by the forward end portion of the nozzle member in the nozzle bore discharge end is a back up member 88 and a resilient cup 89 for forming a fluid seal with the wall defining the nozzle bore. The inlet end of nozzle member is fluidly connected to a source of fluid under pressure by, for example connector 43.

For releasably retaining the back up member and resilient cup in the nozzle bore, there is provided a pair of transversely elongated jaws 90,91; the jaw 90 being mounted for movement by the one ends of a pair of transversely spaced arm 92. The opposite ends of the arms 92 are pivotally mounted by transverse spaced studs pivots 94 that are secured to the nozzle member, the pivots also mounting the rearward ends of arms 93. The forward ends of the arms 93 mount the jaw 91. For moving the arms between a jaw open and a jaw closed position, there is provided a cam 95 between the arms, the cam being mounted by a cam shaft (not shown) which in turn is mounted by the nozzle member. Advantageously there is provided springs (not shown) to resiliently retain the jaws in a closed position.

On the longitudinal opposite sides of the jaws from the nozzle member there is a silencer 96 having a longitudinally extending bore and generally transverse slots 97 opening to the silencer bore. On transverse opposite sides of the nozzle member and silencer there is provided an elongated strip 98 for securing the silencer to the nozzle member, the strips 98 not interfering with the movement of the jaws 90,91 between a datum closed and an open position. The adjacent edges of the silencer and nozzle member are spaced sufficiently to permit substantially only translatory movement of the jaws relative to one another. That is, the jaws are not pivoted about the axis of the cam pivot members 94. In order to permit the jaws being translated relative to one another, the forward end portions of the arms 92,93 are extended through slightly enlarged apertures (not shown) provided in the jaws.

The silencer bore is longitudinally aligned with the nozzle bore and is of substantially larger diameters than each of the back up members and resilient cup whereby the back up member and resilient cup may readily move through the silencer, once the jaws move to their open position. A suitable subframe (not shown) is provided to mount the nozzle member on the vehicle. Referring now to FIG. 12, the first embodiment of the control mechanism, generally designated at 110, includes an ignition switch 112 connected across the battery 111 and the junction 113. Connected in series across junction 113 and the opposite side of the battery are switch 114, switch 115, and an electrically actuated operator 116. The operator, which may actuate hydraulic circuitry or may be an electric motor, or another electrical device of suitable nature, is connected by linkage 117 to the cam arm 118 that is mounted on the cam shaft 119 of the nozzle member 120. Upon the closure of all three of the switches 112, 114 and 115, operator 116 is actuated to move the linkage 117 and thereby cam arm sufficiently to pivot the cam shaft for spreading the jaws arms moving the jaws from a datum closed position to a datum open position (or linkage 117 connected to arm 87 to move ball 80; or to pivot member 257 of FIG. 21 to move said pivot member as will be described). In this connection the nozzle member may be of a construction the same as any one of embodiments 1 to 8 of the jet stop apparatus.

Switch 115 is physically located on the dashboard or adjacent the steering wheel in a position to be readily accessible to be manually closed by the driver of the vehicle. As to switch 114, this is operated through the depressing of the brake pedal 121, the depressing movement of the brake pedal being transferred through linkage 122 to close switch 114.

Referring to FIG. 13, the second embodiment of the control mechanism generally designated 125, is the same as the first embodiment 110 other than for the provision of an additional switch 126 and mechanism for operating the switch to a closed position. That is, in the control mechanism 125, the ignition switch 112, the brake actuated switch 114, switch 126, the emergency manually operated stop switch 115, and operator 116 are connected in a series across the battery 111. The switch 126 is operated to a closed position upon the vehicle exceeding a predetermined speed. This may be accomplished, for example by providing a governor 128 on the motor, the governor directly or indirectly through suitable mechanism (not shown) operating the linkage 127 to move the switch to 126 to a closed position upon the vehicle exceeding the predetermined speed. Another manner of actuating switch 126 to a closed position would be through a speedometer cable outlet on the transmission of the vehicle that operated switch 126 to a closed position upon the vehicle exceeding a preselected speed.

Referring to FIG. 14, the fifth embodiment of the jet stop apparatus of this invention, generally designated 140, includes a nozzle member 141 having a longitudinally elongated nozzle member bore 142 mounted by a subframe (not shown) on the vehicle. The inlet (not shown) of the nozzle member is fluidly connected to a source of fluid under pressure by, for example connector 43. The rearward ends of the transversely spaced pair of arms 144 are mounted on stud pivots 143 which in turn are mounted on diametrically opposite portions of the nozzle member. The forward ends of the arms 144 mount an upper transverse jaw 146 in a position to extend across the upper half of the discharge end of the nozzle bore 142. A lower jaw 147 is mounted by the forward ends of arms 145 in a position to extend across the lower half of the discharge end of bore 142, the forward ends of arms 145 being pivotally mounted by pivot members 143. The jaws in their datum closed position releasably retain the back-up member and resilient cup 148 in the discharge end of the nozzle bore. Suitable springs (not shown) may be provided to releasably retain the arms in a jaw closed position.

In order to move the jaws to their spread apart position, a cylinder 149 is mounted on one side of the nozzle member intermediate the adjacent arms 144,145. Cylinder 149 has a central divider plate 149a dividing the cylinder into two cylinder chambers 153,154 respectively. Mounted in chamber 153 is a piston 150 such that the piston rod extends outwardly through the cylinder to abut against an intermediate portion of arm 145. An oppositely disposed piston 151 is mounted in chamber 154 to have its piston rod extend outwardly into abutting engagement with an intermediate portion of arm 144. A fluid supply line 152 for the cylinder has bifurcated ends that opens to chambers 153,154 respectively whereby supplying fluid under pressure through line 152 results in the pistons 150,151 moving in opposite directions for forcing the arms to pivot about the pivot axis of pivot members 143 for spreading the jaws apart.

Referring to FIGS. 15 and 16, the sixth embodiment of the jet stop apparatus of this invention, generally designated 160, includes a nozzle member 161 having a longitudinally elongated nozzle member bore 162 mounted by a subframe (not shown) on the vehicle. The nozzle member inlet (not shown) may be connected to a source of fluid under pressure by, for example, connector 43. In order to releasably retain the resilient cup and back up member 175 in the discharge end of the nozzle bore, there is provided an upper jaw 168 and a lower jaw 167. The forward end portions of transversely spaced arms 166 mount the lower jaw while the rearward end portions of said arms are pivotally mounted by a transverse pivot member 164. Pivot member 164 is mounted on first lugs 163 that are attached to the nozzle member. Second lugs, which are mounted on the nozzle member to extend outwardly thereof on the opposite side of the nozzle member from the first lug 163, mount a pivot member 173 to extend parallel to pivot member 164. The rearward end portions of a transversely spaced pair of arms 165 are mounted by pivot member 173, the forward end portions of arms 165 mounting the upper jaw 168.

There is provided a solenoid that includes a solenoid member 169 mounted on the nozzle member. Solenoid member 169 mounts a plunger 171 having a yoke end that extends on opposite sides of the projection portions 167a, 168b respectively of the jaws for releasably retaining the jaws in a closed position. The solenoid includes a coil 170 that upon being energized, operated the plunger 171 in the direction of the arrow 174 out of abutting relationship with jaw projections 167a, 168a to permit the jaws moving to a spread apart condition. A coil spring 172 has one end seated against an intermediate portion of arm 165 and an opposite end seated against the intermediate portion of arm 166 for resiliently urging the arms, and thereby the jaws, to their spread apart condition.

Referring now to FIG. 17 and 18, the seventh embodiment of the jet stop apparatus, generally designated 180, includes a nozzle member 181 having a longitudinally elongated bore 182. The nozzle member is mounted on the vehicle by a suitable subframe (not shown) and has an inlet end portion (not shown) fluidly connected to a source of fluid under pressure by, for example connector 43. A bracket 183 is mounted on the discharge end portion of the nozzle member to extend outwardly therefrom, the bracket having one edge portion of a resilient member 184 fixedly secured thereto, by, for example rivets 189. The member 184 is of sufficient dimensions to block the discharge opening of bore 182, the resilient member having an annular flange 184a projecting into the bore to form a fluid seal with the wall defining said bore. A plurality of score lines 184b are cut into the resilient member on the opposite side thereof from the nozzle member bore, the score lines extending only partially through the resilient member. An upper jaw 185 and a lower jaw 186 in a closed position abut against the surface of the resilient member opposite the nozzle member to provide sufficient support for the resilient member to prevent the pressure in the nozzle bore from rupturing the resilient member along the score lines. Pairs of arms 187,188 have their forward ends connected to the jaws 185,186 respectively for moving the jaws between their datum closed and their open positions. The forward ends of the arms are mounted by structure (not shown) and are operated by structure which may be the same as that described with reference to the previous embodiments for mounting the arms and moving the jaws between their closed and opened positions.

Referring to FIG. 19, the third embodiment of control mechanism, generally designated 190, includes ignition switch 196, a solenoid coil 192 of the solenoid 193 and switch 194 that are connected in series across battery 191. Switch 194 is operatively connected to governor 195. A high pressure relief valve 198 is provided in the hydraulic brake line 199 intermediate the brake cylinders 200 and the brake pedal 201. A line 202 fluidly connects the relief port of valve 198 to a first port of valve 203, ball check mechanism 198a being resiliently retained in a position to block fluid flow between lines 199,202. Valve 203 has a second port that is connected by a fluid line 204 to the cylinder chambers of the cylinder 149 (or another suitable hydraulically operated device for operating the jaws to the spread apart condition). The valve member 205 is resiliently retained in the position to block fluid communication between lines 202,204; but is operable by the energization of coil 192 to establish a fluid flow path between lines 202,204. With the aforementioned circuitry, even if the brake pedal 201 is depressed, no fluid under pressure is applied to cylinder 149 unless coil 192 also has been energized. On the other hand if coil 192 has been energized, but the brake pedal is not depressed sufficiently hard that fluid is forced through valve 198 to line 202, no fluid under pressure is applied to cylinder 149.

Referring now to FIG. 20, the fourth embodiment of the control mechanism generally designated 215, of this invention includes a valve 216 provided in the line 217 that extends between the brake 201 and the brake cylinders (not shown). The valve mounts a valve member 218 that upon sufficiently high pressurization of fluid in line 217 moves the valve member to, through linkage 219, move the electrical switch 220 to a closed position. A normally open emergency stop switch 221, which is mounted on the dashboard or adjacent the steering wheel, and a normally open switch 225 are connected in parallel across junctions 222,223. A solenoid coil 224, a normally open switch 220, ignition switch 233 and a battery 232 are connected in series across junctions 222,226, junction 223 being connected to junction 226. A governor 220 through linkage 227 operates switch 225 to a closed position upon the vehicle exceeding a predetermined speed. Switch 220 is normally in an open condition, however upon depressing brake pedal with excessive braking pressure, switch 220 is moved to a closed position; and upon releasing the excessive braking pressure on the brake pedal switch 220 again moves to an open condition.

Referring now to FIGS. 21-23, the eighth embodiment of the jet stop apparatus, generally designated 240, includes an elongated nozzle member 241 having a bore 242 that discharges through the outlet opening 243. In order to block the discharge of fluid through outlet 243, there is provided a resilient cup 244 having an annular flange to form a fluid seal with the adjacent portion of the wall of the nozzle member defining bore 242. The cup is mounted in a cylindrical recess provided in cap 250, the cup being secured to the cap to move therewith. The cap has a pair of spaced lugs 250a into which the hooked end of the elongated, generally J-shaped bar (arm) 249 is extended. The aforementioned hooked portion of bar 249 is pivotally connected to lugs 250a by a pivot member 248.

A pair of longitudinally elongated, spaced mounting plates 245 are mounted on the nozzle member 241 to extend in the direction of elongation of the bore 242 and to terminate outwardly (forwardly in the normal direction of travel of the vehicle) of the discharge end of bore 242. The one ends of the mounting plates each mounts a pivot member 246, each pivot member in turn pivotally mounts the one end of the adjacent one pair of arms 247. The opposite ends of the arms are fixedly attached to the respective lugs 250a. In this connection it is to be noted that pivot members 246 do not interfere with the movement of the J-bar 249. A pair of links 251 each have their one end portion pivotally connected to the opposite end of the adjacent plate 245 by a pivot member 252 with one link on either side of bar 249. The opposite ends of the links are pivotally connected to bar 249 by a pivot member 253. A pivot member 257 pivotally connects the clevis end of piston rod 255 of the piston cylinder combination 255,256 to the end portion of bar 249 that is remote from pivot 248. The aforementioned combination includes a cylinder 256 which is pivotally connected at 258 to lugs 259 that are welded to the nozzle member 241. The pivot axes of pivot members 248, 246, 253, 255 and 258 are parallel to one another.

In the cup fluid seal position of FIG. 21, the piston rod 255 is in a retracted condition whereby pivot member 257 is longitudinally intermediate pivot members 253,258; pivot member 253 is longitudinally intermediate pivot members 252,257; pivot members 246 are longitudinally intermediate pivot members 248,252; and pivot member 248 is transversely on the opposite side of pivot members 246,256 from pivot member 257.

A block 262 is welded to the end portion of nozzle member 241 that is opposite outlet 243, block 262 having a bore 263 that opens to the inlet end of bore 242. Bore 263 opens to the intermediate portion of a bore 264 provided in the block. A suitable container or containers 265 are connected to bore 264 by lines 266, the containers being provided for storing gas under pressure. Suitable valve mechanism (not shown) of the nature described with reference to FIG. 4 may be provided in block 262 for controlling the flow of fluid from containers 265 to a nozzle member and to provide for charging the containers.

The jet stop apparatus 240 is mounted on the vehicle through suitable frame members (not shown).

In using the first embodiment of the jet stop apparatus of this invention, when mounted on the vehicle, the handle member 45a is turned to a position to permit fluid communication between the inlet nozzle 45b and the tanks 46 and block fluid communication between nozzle member 45b and tube 43. At this time a suitable source of gas under pressure is applied through a nozzle member 45b to pressurize the tanks; and thereafter the valve member 45a is turned to a position blocking fluid flow between connector 44 and nozzle member 45b and permitting fluid communication between tube 43 and the tanks 46 (assuming that the jaws 29,30 are in a closed position retaining the back up member 38 and cup 39 in the discharge end of bore 28).

Also it will be assumed linkage 117 of the first embodiment of the control mechanism (FIG. 12) is connected to arm 36, and with the vehicle going, the ignition switch 112 is closed. Now, assuming that an emergency situation arises, and it is necessary to very quickly stop the vehicle; at this time, the brake pedal 121 is depressed to operate switch 114 to a closed position, and the emergency stop switch 115 is manually closed to energize operator 116. The actuation of operator 116 pivots arm 118 (same as arm 36) and thereby cam member 35 to move the jaws 29,30 to a spread apart position. With the jaws in a spread apart condition, the fluid under pressure existing in bore 28 forces the back up member and resilient cup 39 in the direction of the arrow 40 out of the nozzle to permit rapid discharge of fluid from the tanks through the discharge end of the nozzle member. This acts to quickly stop the vehicle.

Of course, if the control mechanism 125 (FIG. 13) is utilized in place of the control mechanism 110, the operation of the first embodiment is the same, except that if the vehicle has not reached a predetermined speed, then the jet stop apparatus of the first embodiment will not be actuated. Thus an advantage of the second embodiment of the control mechanism over the first embodiment is that the jet stop apparatus cannot be operated unless the vehicle is going more than a predetermined speed and cannot accidently be operated when the vehicle is stopped.

The operation of the second embodiment of the jet stop apparatus 55 is the same as that of the first embodiment other than that the spreading of the jaws 60,61 results in two back up members 58 and two resilient cups 59 being discharged; the arms 68 being connected through suitable linkage to operator 116 to be moved to a jaw spread apart position upon energizing operator 116.

With reference to the third embodiment 75 of the jet stop apparatus, the arm 87 is connected through suitable linkage to operator 116 (either that of FIG. 12 or 13) whereupon by the actuation (energization) of the operator, the arm 87 is pivoted in the direction of the arrow 237 about pivot members 84 to a position bore 81 is longitudinally aligned with the central axis of the nozzle member bore 77. A disadvantage of the third embodiment 75 is that the jet blast is initially diverted in a downward position (assuming that bore 81 in a nozzle member close position points downwardly and forwardly) and until the bore 81 is aligned with the longitudinal axis of the nozzle member bore.

The operation of the fourth embodiment of the jet stop apparatus 85 is the same as that of the first three embodiments; other than, there is provided a silencer to muzzle the explosive sound upon the back up member and resilient cup moving away from the nozzle member, and the jaws are translated rather than pivoted between their opened and closed positions.

With reference to the fifth embodiment of the jet stop apparatus 140, it will be assumed that the line 204 of the third embodiment of control mechanism (FIG. 19) is connected to line 152 for applying fluid under pressure to cylinder 114 (that lines 152 and 204 are the same). When the vehicle is stationary, even if switch 196 is closed, switch 194 will be in an open condition and thereby valve member 205 in a position to block the flow of fluid under pressure from line 202 to line 204. Accordingly, the jaws 146,147 are retained in a closed position even though the brake pedal 201 is depressed with excessive pressure that otherwise would apply fluid under pressure to cylinder 149.

With the vehicle going above a predetermined speed, switch 194 is operated to a closed position whereupon the valve member 205 is moved to place line 202 in fluid communication with line 152 (line 204), however the valve mechanism of valve 198 prevents the flow of fluid under pressure from line 199 to line 202 until the brake 201 has been depressed sufficiently hard to overcome the resilient action of the spring 198a of the valve. When the brake pedal has been depressed sufficiently fluid under pressure is forced from line 199 to line 202, and thence to line 152 (204) to the cylinder 149 for moving the pistons 150,151 away from one another. As a result, the jaws 146,147 are moved to open positions to permit the fluid under pressure in the nozzle member forcing the back up member and resilient cup 148 out of the nozzle member; and thereupon escaping fluid aiding in braking the vehicle.

In place of the control mechanism 190, the jet stop apparatus 140 may be actuated by the control mechanism 110, or 125, provided that the operator 116 is of a type that upon being energized, it permits hydraulic fluid under pressure being applied to cylinder 149.

With reference to using the sixth embodiment of the jet stop apparatus 160 (FIGS. 15,16) it may be advantageously used with the control mechanism of FIG. 20. In such a case the solenoid coil 170 of FIG. 15 and the solenoid coil 224 of FIG. 20 would be one and the same. With the vehicle on which the jet stop apparatus 160 is mounted going above a preselected speed, the ignition switch 233 and the governor switch 225 would be in closed positions. Under a normal braking pressure, valve member 218 would not be moved to closed switch 220; however, upon the application of excessive braking pressure the valve member would be so moved. Upon the closing of switch member 200, the coil 224 would be energized whereupon plunger 171 would be moved in the direction of the arrow 174. As a result springs 172 would move the arms 165,166 to their spread apart condition whereupon fluid under pressure would force member 175 out of the nozzle bore and exhaust forwardly from nozzle bore 162 to aid in braking the vehicle.

In the event that the vehicle was traveling at a speed lower than the preselected speed, then switch 225 would be open. Now if an emergency stop situation occurred, upon the application of excessive braking pressure to close switch 220 and manually depressing switch 221, coil 224 (coil 170) would be energized whereupon fluid under pressure would be exhausted from nozzle member 162. Thus the control mechanism of FIG. 20 provides for emergency stopping at higher than preselected speeds even though the driver does not think of closing the emergency stop switch 221. However, at lower speeds it will be necessary to close switch 221 to actuate the emergency stop apparatus with the control mechanism of FIG. 20.

As to the operation of the seventh embodiment of the jet stop apparatus 180 (FIGS. 17 and 18) any one of the proper combination of jaw arm spreading apparatus and control mechanism previously described may be utilized. As previously indicated, at the time the jaws 185,186 are moved apart, the high pressure fluid in the nozzle member will cause the resilient member 184 to rupture at the score lines 184b. As a result, fluid under high pressure will be exhausted through the nozzle member discharge end without the resilient member being projected away from the nozzle member.

When using the apparatus of the eighth embodiment, through suitable control mechanism such as has been previously described, for example that of FIG. 19, upon applying fluid under pressure to cylinder 256, pivot member 257 is urged in the direction of arrow 270 away from pivot member 258. This results in the bar 249 moving links 251 to pivot about pivot members 252 in the direction of the arrow 271 and the cap to pivot about pivot members 246 in the direction of the arrow 272. Due to the relative locations of the pivot members, the length of links 251, and the dimensions of arms 247, pivot member 248 is pivoted about pivot members 246 through a substantially greater angular distance than pivot member 253 is pivoted about pivot members 252. Thus, a small movement of pivot member 257 results in the cap and the cup attached thereto being moved quickly from a closed position to a fully opened dotted position shown in FIG. 21. However the cap and cup are retained in a datum fluid seal condition until fluid under pressure is applied to the end of cylinder 256 for moving piston rod 255 to its expanded condition; in part due to the axis of pivot member 257 being on the opposite of a straight line through the pivot axes of pivot members 252,253 from the inlet end portion of the nozzle member.

It is to be understood that a solenoid having a plunger may be utilized in place of the piston cylinder combination 255,256 for moving pivot member 257 between its positions.

It is to be understood that the nozzle members of this invention may be mounted on the roof of a vehicle with a suitable subframe and the container or containers storing fluid under pressure may be provided in the trunk of the vehicle with suitable length lines for conducting the fluid under pressure from the containers to the inlet end of the nozzle bore of the nozzle member. If the nozzle member is mounted on the roof of the vehicle, advantageously the discharge end of bore 242 would be directed in a slightly upwardly direction whereby a downward component of force would be exerted against the vehicle to enhance the braking action. If the jet stop apparatus is mounted on top of the vehicle, it is preferred that the embodiment of FIG. 8, or FIG. 17, or FIG. 21 be used.

With passenger vehicles, two of the jet stop apparatus of this invention could be used wherein one is attached to the top of the wall braced roll bar to direct an exhaust blast slightly upwardly and forwardly, and at a second attached to the rear of the vehicle for directing an exhaust blast almost level to the road to minimize the angular lift of the rear of the vehicle.

With trucks or semi-trailers, a series of jet stop apparatus members of this invention may be mounted therebeneath with their discharge ends pointing forwardly. For example six or more nozzle members 275 as diagrammatically shown in FIG. 11 could be connected to control mechanism (not shown) to operate first two nozzle members to discharge and thence two more and etc. Thus should the brakes fail on a long grade, the stop members may be actuated in sequence to give the driver a chance to get the truck into a lower gear.

A suitable type gas to be used in the tanks that is liquid nitrogen. Desirably, a safety release valve will be provided on the tank to release any excess pressure build-up without releasing the full content of the tanks. It is to be understood that any non-inflammable gas or compressed air to be used in place of liquid nitrogen.

Tanks or containers for the compressed gas could be made of stainless steel; although because of weight shatter proof aluminum or fiberglass construction is preferred. One or more containers having a total capacity of two cubic feet volume for each jet stop nozzle is adequate for most purposes. Further, for most purposes, filling the containers to a pressure of 1,000 to 2,500 pounds is satisfactory while the cross sectional area of the discharge outlet of about one square inch is adequate. Of course the pressure and size of the discharge outlet would in part depend on the weight of the vehicle to be stopped.

With reference to the controls of FIGS. 12 and 13, switches 114 are operated to a closed position with normal or higher than normal braking pressure on pedal 121. However as to the controls of FIGS. 19 and 20, the braking pressure for permitting passage of fluid under pressure through line 202 and closing switch 220 respectively has to be higher than that applied during normal stopping situations to prevent exhausting of fluid under pressure through the jet nozzle members other than under emergency situations. Also with reference to the controls of FIGS. 19 and 20, the governor switch mechanism 194,195 and 225,227,228 respectively could be operated from a speedometer cable outlet such as described with reference to switch 126 of FIG. 13.

It is possible to use a modified area construction that is operated by an electrically detonated explosive charge for moving the arms from a datum to fluid discharge position. However it is preferred that other than an explosive charge be used.

Another modified construction of the controls would be to use the controls of FIG. 13, except eliminate switch 115 and provide a valve 216 for operating switch 114 to a closed position. With this arrangement, as long as the vehicle was moving, and the ignition switch closed, upon depressing the brake with excessive (above normal) braking pressure, the jet apparatus would be actuated. An advantage would be that even at slow speeds, if an emergency stop situation came up, jet stop apparatus would be actuated without having to remember to manually operate another switch such as 115 to a closed position.

What is claimed is:

1. For assisting in stopping a land vehicle having a motor and a brake system including a brake pedal, an emergency stop system comprising a nozzle member having a nozzle bore, said nozzle bore having a discharge end portion and an inlet end portion, first means for mounting the nozzle member on the vehicle to have the discharge end portion pointing generally forwardly in the normal direction of travel of the vehicle, second means connected to the nozzle member for supplying fluid under pressure to the nozzle bore inlet end portion, third means movably connected to at least one of the nozzle member and the first means for releasably blocking the discharge of fluid under pressure through the nozzle bore discharge end portion and control means connected to the third means for operating the third means to permit the discharge of fluid under pressure through the nozzle discharge end portion, said control means including a switch member operated between a datum position and a closed position by said brake pedal and fourth means connected in series with the switch member for operating the third means.

2. The apparatus of claim 1 further characterized in that the third means includes fifth means mounted adjacent the bore discharge end portion for movement between a fluid discharge position and a position blocking fluid discharge, and operable sixth means mounted by one of the nozzle member and the first means for mounting and moving the fifth means between its positions, said fifth means having a fluid discharge bore extending therethrough.

3. The apparatus of claim 2 further characterized in that the fourth means includes an operator for operating the sixth means, and closable switch means connected in series with the brake switch and the operator to actuate the operator when the switch means and brake switch are closed.

4. The apparatus of claim 1 further characterized in that the third means includes fifth means cooperating with the nozzle member for forming a fluid seal with the nozzle member adjacent the bore discharge end portion to block the discharge of fluid through the discharge end portion and sixth means mounted by one of the nozzle members and the first means for releasably retaining the fifth means in a fluid discharge blocking position.

5. The apparatus of claim 4 further characterized in that fifth means includes a resilient member and that the sixth means includes an elongated arm having a first end portion and a second end portion, seventh means connecting the first end portion to one of the first means and nozzle member for mounting the arm for swinging movement between a datum position and a fluid discharge position, and eighth means mounted by the arm second end portion for movement therewith for retaining the resilient member in a fluid seal condition with the discharge outlet when the arm is in its datum position.

6. The apparatus of claim 5 further characterized in that the seventh means comprises a link having a first end portion pivotally connected to the nozzle member and a second end portion pivotally connected to the arm.

7. The apparatus of claim 5 further characterized in that the fourth means includes a piston cylinder combination for moving the arm from its datum to its fluid discharge position, operable valve means for applying fluid under pressure to said combination and alternately blocking the application of fluid under pressure to said combination, an electrical operator for operating the operable valve means from a fluid blocking to a fluid applying condition, and electric switch means for selectively actuating the operator, that the brake system includes a pressurizable fluid line, said brake switch member including valve means in the fluid line for applying fluid under pressure to the operable valve means when the pressure of fluid in the line exceeds a preselected value.

8. The apparatus of claim 5 further characterized in that the sixth means includes a second arm having a first end portion and a second end portion, said seventh means being connected to the second arm first end portion for mounting the second arm for swinging movement between a datum position and a fluid discharge position and ninth means mounted by the second arm second end portion to cooperate with the eighth means for retaining the resilient member in a fluid seal condition with the discharge end portion when the second arm is in its datum position.

9. The apparatus of claim 8 further characterized in that the resilient member has one end portion fixedly attached to the nozzle member and a scored portion intermediate the eighth and ninth means in the arms datum positions and the discharge end portion whereby the scored portion ruptures from fluid under pressure in the nozzle bore as the arms are moved from their datum to their discharge position.

10. The apparatus of claim 5 further characterized in that the fourth means includes a governor connected to the motor and a governor operated closable switch connected in series with the brake switch member that is operated by the governor when the vehicle exceeds a preselected speed.

11. The apparatus of claim 10 further characterized in that the fourth means includes an operator for operating the third means to its fluid discharge position and ninth means connected in series with the brake switch member and the governor switch for actuating the operator.

12. The apparatus of claim 11 further characterized in that the ninth means includes a vehicle driver operated switch in the interior of the vehicle.

13. The apparatus of claim 11 further characterized in that the control means includes a vehicle driver operated, closable switch in the interior of the vehicle connected in parallel with the governor switch and in series with the brake switch member to permit actuation of the operator.

14. The apparatus of claim 11 further characterized in that the ninth means includes a vehicle ignition switch connected in series with the brake switch member and governor switch.

15. The apparatus of claim 11 further characterized in that the brake switch is a fluid pressure responsive switch that has an electric switch member normally retained in an open condition and movable to a closed position and means operated by the fluid pressure in the brake system exceeding a preselected value for moving said electric switch to a closed position, said electric switch being connected in series with the governor switch.

16. A land vehicle having a battery, a motor, an ignition switch connected to the battery to control the starting and stopping of the motor, a braking system including a brake pedal, and an emergency stop system that includes a nozzle member having a nozzle bore, said nozzle bore having a discharge end portion and an inlet end portion, first means for mounting the nozzle member on the vehicle to have the discharge end portion pointing generally forwardly in the normal direction of travel of the vehicle, second means connected to the nozzle member for supplying fluid under pressure to the nozzle bore inlet end portion, operable third means movably connected to at least one of the nozzle members and the first means for releasably blocking the discharge of fluid under pressure through said bore discharge end portion, operator means connected to the third means to operate the third means to permit the discharge of fluid under pressure through said discharge end portion and control means including a plurality of series connected, closable switches for actuating the operator upon the switches being closed, the third means including fourth means in the bore discharge portion in movable relationship thereto for blocking the discharge of fluid under pressure through the bore and alternately permitting the discharge of fluid through the bore, and fifth means for retaining the fourth means in a fluid discharge blocking position, said fifth means being operable by the operator means to allow the fourth means to permit discharge of fluid under pressure through said bore.

17. The apparatus of claim 16 further characterized in that the fifth means includes an elongated arm and means for mounting the arm for swinging movement relative the nozzle member.

18. For assisting in stopping a land vehicle having a battery, a motor, an ignition switch connected to the battery to control the starting and stopping of the motor and a braking system including a brake pedal, an emergency stop system comprising a nozzle member having a nozzle bore, said nozzle bore having a discharge end portion and an inlet end portion, first means for mounting the nozzle member on the vehicle to have the discharge end portion pointing generally forwardly in the normal direction of travel of the vehicle, second means connected to the nozzle member for supplying fluid under pressure to the nozzle bore inlet end portion, operable third means movably connected to at least one of the nozzle members and the first means for releasably blocking the discharge of fluid under pressure through said bore discharge end portion, operator means connected to the third means for operating the third means to permit the discharge of fluid under pressure through said discharge end portion and control means connected in series with the ignition switch to actuate the operator means.

19. The apparatus of claim 18 further characterized in that the control means includes a closable, manually operated switch in the interior of the vehicle connected in series with the ignition switch and the battery to block actuation of the operator until both the ignition switch and manually operated switch are closed.

20. The apparatus of claim 18 further characterized in that the control means includes first switch means operated by a greater than predetermined depressing pressure on the brake pedal for acting in cooperation with the ignition switch to control the actuation of the operator means.

21. The apparatus of claim 20 further characterized in that the control means includes governor operated switch means connected in series with the ignition switch and battery to permit actuation of the operator means after the vehicle exceeds a predetermined speed.

22. The apparatus of claim 21 further characterized in that the operator means includes a solenoid having a solenoid coil and a plunger moved by energizing the coil.

23. The apparatus of claim 22 further characterized in that the coil and first switch means are connected in series with the governor switch means and the ignition switch.

24. The apparatus of claim 23 further characterized in that the operator means includes a hydraulic piston cylinder combination, and a control valve connected to said combination, said valve having a valve member movable between positions blocking and permitting the flow of fluid therethrough, that said plunger is connected to the valve member to move the valve member, and that the first switch means comprises a check valve fluidly connected to the control valve to supply fluid under pressure thereto when the brake pedal is depressed with a sufficiently high, preselected pressure.

25. The apparatus of claim 18 further characterized in that the third means includes an elongated arm having a first end portion and a second end portion, and fourth means connecting the arm first end portion to one of the nozzle member and the first means for swinging movement between a datum position and an arm fluid discharge position.

26. The apparatus of claim 25 further characterized in that the third means includes a ball having a bore therethrough located in the nozzle bore and that the fourth means mounts the ball to move therewith between positions permitting fluid in the nozzle bore discharging through the ball bore and blocking the discharge of fluid through the nozzle bore.

27. The apparatus of claim 25 further characterized in that the third means includes a cap member mounted by the arm second end portion to block the discharge of fluid through the discharge end portion when the arm is in its discharge position, said cap member being connected to the arm to be moved by movement of the arm.

28. The apparatus of claim 27 further characterized in that there is provided means for pivotally connecting the cap to the nozzle member, and that the fourth means includes a link having one end pivotally connected to the nozzle member and an opposite end pivotally connected to the arm first end portion.

29. The apparatus of claim 25 further characterized in that the third means includes a second arm having a first end portion and a second end portion, said fourth means mounting the second arm second end portion for swinging movement to permit the second arm moving from a datum position to a fluid discharge position that the arms second end portions are more remote from one another than in the arms datum positions.

30. The apparatus of claim 29 further characterized in that the third means includes a resilient member having a portion aligned with the nozzle bore to form a fluid seal with the nozzle member to block discharge of fluid through the bore, a jaw member mounted by each arm second end portion for movement therewith to retain the resilient member in condition to block the discharge of fluid through the discharge outlet when the arms are in their datum positions and permit the discharge of fluid when the arms are moved to their discharge positions.

31. The apparatus of claim 30 further characterized in that the resilient member has a second portion fixedly attached to the nozzle member, and that the first mentioned resilient member portion is scored to permit rupture thereof when the jaw members are moved by the arms moving from their datum positions.

32. The apparatus of claim 30 further characterized in that the resilient member is releasably retained in the nozzle bore and that the third means include a back up member between the resilient member and the jaws in the arms datum positions, said resilient member and back up member being freely movable away from the nozzle member when the jaws are moved by the arms to the arms discharge position.

33. The apparatus of claim 30 further characterized in that the operator means includes spring means for resiliently urging the arms to move from their datum positions to their discharge positions, and operable plunger means for releasably retaining the jaws in the arms datum positions and that the control means includes means for operating the plunger means to release the jaws for spreading movement and thereby permitting the arms moving to their discharge positions.

34. The apparatus of claim 30 further characterized in that the operator means includes piston cylinder means for moving the arms from their datum positions to their discharge positions.

* * * * *